United States Patent
Webster

(10) Patent No.: US 6,738,965 B1
(45) Date of Patent: May 18, 2004

(54) TRACE INFORMATION IN A VIRTUAL MACHINE

(75) Inventor: Matthew Alexander Webster, Hook (GB)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 09/717,814

(22) Filed: Nov. 21, 2000

(30) Foreign Application Priority Data

May 13, 2000 (GB) .............................................. 0011505

(51) Int. Cl.⁷ ............................................... G06F 9/44
(52) U.S. Cl. ....................... 717/128; 717/130; 717/139; 717/158; 719/332
(58) Field of Search ................................ 717/128, 130, 717/154–158; 702/186, 187; 719/332

(56) References Cited

U.S. PATENT DOCUMENTS

| | | | |
|---|---|---|---|
| 3,707,725 A | * 12/1972 | Dellheim | 714/38 |
| 4,802,165 A | * 1/1989 | Ream | 714/38 |
| 5,771,385 A | * 6/1998 | Harper | 717/128 |
| 5,896,536 A | * 4/1999 | Lindsey | 717/128 |
| 6,055,492 A | 4/2000 | Alexander, III et al. | 702/179 |
| 6,139,198 A | * 10/2000 | Danforth et al. | 717/128 |
| 6,163,880 A | * 12/2000 | Ramalingam et al. | 717/104 |
| 6,311,325 B1 | * 10/2001 | Levine et al. | 717/128 |
| 6,324,686 B1 | * 11/2001 | Komatsu et al. | 717/148 |
| 6,338,159 B1 | * 1/2002 | Alexander et al. | 717/128 |
| 6,539,339 B1 | * 3/2003 | Berry et al. | 702/186 |
| 6,539,501 B1 | * 3/2003 | Edwards | 714/45 |

FOREIGN PATENT DOCUMENTS

GB 2356951 A 6/2001

OTHER PUBLICATIONS

Mario Wolczko, Mar. 22, 1999, "Using a Tracing Java Virtual Machine to gather data on the behavior of Java Programs", http://research.sun.com/people/mario/tracing-jvm/tracing.pdf.*

"The Tracing JVM" by Mario Wolczko Mar. 22, 1999 (http://www.sun.com/research/people/mario/tracing-jvm/).

* cited by examiner

Primary Examiner—Antony Nguyen-Ba
Assistant Examiner—Trenton Roche
(74) Attorney, Agent, or Firm—David A. Mims, Jr.

(57) ABSTRACT

A virtual machine in an object-oriented system includes an interpreter. In order to provide trace information from a program about specific method calls, a user defines a selection of methods to be traced. As the program runs on the interpreter, it is determined, whether or not the method is included within the selection to be traced. For those methods included within the selection, trace information about the method call is outputted. A method block is associated with each method and is used by the interpreter to invoke the method. For each method within the user-defined selection, a flag is set within the method block associated with the method. The status of this flag is checked when the interpreter invokes a method, in order to determine whether or not the method is included within the selection.

19 Claims, 3 Drawing Sheets

TRACE INFORMATION IN A VIRTUAL MACHINE

BACKGROUND OF THE INVENTION

1. Field of the Invention

The present invention relates to a method of operating a virtual machine including an interpreter to provide trace information.

2. Description of the Related Art

Programs written in the Java programming language (Java is a trademark of Sun Microsystems Inc) are generally run in a virtual machine environment, rather than directly on hardware. Thus a Java program is typically compiled into byte-code form, and then interpreted by the Java virtual machine (JVM) into hardware commands for the platform on which the JVM is executing. The JVM itself is an application running on the underlying operating system. An important advantage of this approach is that Java applications can run on a very wide range of platforms, providing of course that a JVM is available for each platform.

Java is an object-oriented language. Thus a Java program is formed from a set of class files having methods that represent sequences of instructions (somewhat akin to subroutines). A hierarchy of classes can be defined, with each class inheriting properties (including methods) from those classes (termed superclasses) which are above it in the hierarchy. At run-time objects are created as instantiations of these class files, and indeed the class files themselves are effectively objects. One Java object can call a method in another Java object. In recent years Java has become very popular, and is described in many books, for example "Exploring Java" by Niemeyer and Peck, O'Reilly & Associates, 1996, USA, and "The Java Virtual Machine Specification" by Lindholm and Yellin, Addison-Wedley, 1997, USA.

In a general sense the running of a Java program represents a succession of Java method calls. The ability to track or monitor these method calls is very important to a Java programmer for diagnostic and debugging purposes. A conventional JVM supports a runtime option for tracing Java method calls: "java -Xtm", Runtime.traceMethodCalls( ). However, this is both slow and cumbersome, in that every single method call is traced directly to the standard output (stout). The result is something that is unusable in a production environment. It is also possible to turn this tracing on and off within Java programs, but again the results are all or nothing. Even a very simple program can result in thousands of lines of trace information.

It is also known to add specific output instructions to the Java application code; this output can then be used for tracing purposes at the relevant locations. This code then be switched on and off, for example dependent on some runtime setting. However, the output from such solutions is typically non-binary (i.e. slow), and it is also no good for tracing system classes or those classes for which source is unavailable.

A rather different approach is described in "The Tracing JVM" by Mario Wolczko (http://www.sun.com/research/people/mario/tracing-jvm/) and pages referenced therein. This paper describes a significantly modified JVM which traces a predetermined set of events to indicate how objects, stacks and classes are being manipulated. A user can provide an external file to specify those events of interest from the predetermined set of events. The very low level output is perhaps better regarded as profiling rather than tracing information (i.e. more relevant to understanding overall application behaviour rather than specific diagnostics). The modifications to the JVM are sufficiently extensive that the whole performance characteristics of the JVM are modified; therefore the information provided is not useful for understanding performance questions.

In summary therefore, the prior art does not provide a tracing tool for the JVM which provides targeted data, and which can be used with arbitrary applications in a realistic or possibly even production environment.

SUMMARY OF THE INVENTION

Accordingly, the present invention provides a method of operating a virtual machine including an interpreter in an object-oriented system to provide trace information about specific method calls, said method comprising the steps of:

providing a selection of methods to be traced from a program;

running the program on the interpreter;

for each method call in the program, determining whether or not the method is included within said selection; and for those methods which are determined to be included within said selection, outputting trace information about the method call.

The invention exploits the fact that a virtual machine is implemented in software, and so can be configured to provide trace information for the virtual machine environment. The most widespread use of such technology is likely to be in Java, in order to assist in the development of both Java applications, and also those system parts of the JVM which are themselves written in Java (such as class libraries, etc). A user can specify particular trace information of interest, and the interpreter can then track for each called method whether or not trace information is to be provided. The provision of targeted trace information avoids the system having to output large quantities of irrelevant information, thereby greatly assisting in performance. This in turn increases the value of the trace information, since it mirrors much more closely what occurs in a production environment; indeed, the trace information may itself be obtained from a production environment. This is assisted by the fact that the trace operation is enabled by the virtual machine, rather than the application program, so that source code and the ability to recompile are not required.

In a preferred embodiment, there is a method block associated with each method which is used by the interpreter to invoke the method. For each method that is included within said selection, a flag is set within the method block associated with the method. When the interpreter invokes a method using its method block, the status of the flag is checked in order to determine whether or not the method is included within the selection. If so, the interpreter provides trace information for output. In one preferred embodiment the flag comprises multiple bits. This then allows the user to indicate the type of trace information required for any particular method (eg method name, parameter values, parameter types, etc).

Typically the provision of the selection of methods for tracing is performed by creating a table of method calls to be traced. The flags in the method block can then be set in accordance with those method calls included within the table.

One complication is that in Java at least, it is relatively common to use JIT compiled code, which bypasses the interpreter. In such a situation the code for at least some method calls is compiled prior to running the program. In accordance with a preferred aspect of the present invention, during the compiling step, code for outputting trace information is included in those method calls selected by a user. Thus in this case it is (JIT) compiler changes rather than interpreter changes which support the selected provision of trace information.

The invention further provides a computer program product, comprising computer program instructions typically recorded onto a storage medium or transmitted over a network, for implementing the above methods.

The invention further provides an object-oriented system including a virtual machine that provides trace information about specific method calls, said system comprising:

a table specifying methods to be traced from a program;

an interpreter for running the program;

means for determining for each method call in the program whether or not the method is included within said selection; and a diagnostics unit for outputting trace information about a method call for those methods which are determined to be included within said selection.

BRIEF DESCRIPTION OF THE DRAWINGS

A preferred embodiment of the invention will now be described in detail by way of example only with reference to the following drawings.

DETAILED DESCRIPTION OF A PREFERRED EMBODIMENT

Figure 1:
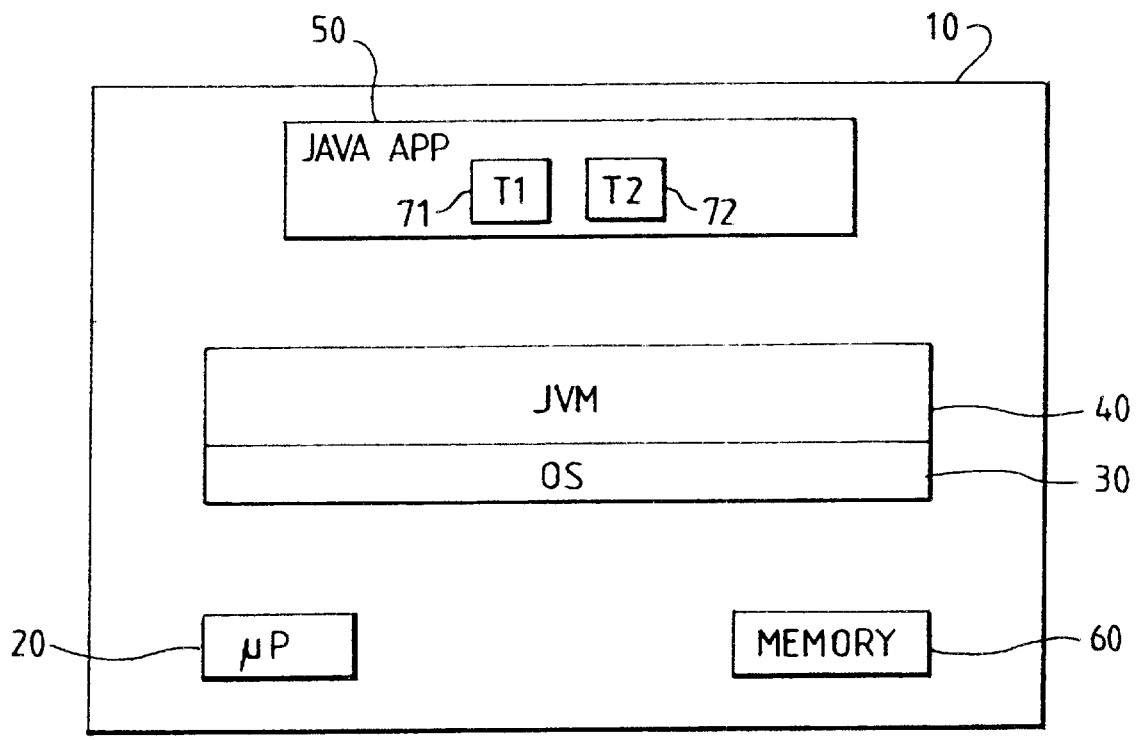
FIG. 1 shows a schematic diagram of a computer system supporting a Java Virtual Machine (JVM)

FIG. 1 illustrates a computer system 10 including a (micro)processor 20 which is used to run software loaded into memory 60. The software can be loaded into the memory by various means (not shown), for example from a removable storage device such as a floppy disc or CD ROM, or over a network such as a local area network (LAN) or telephone/modem connection, typically via a hard disk drive (also not shown). Computer system runs an operating system (OS) 30, on top of which is provided a Java virtual machine (JVM) 40. The JVM looks like an application to the (native) OS 30, but in fact functions itself as a virtual operating system, supporting Java application 50. A Java application may include multiple threads, illustrated by threads T1 and T2 71, 72.

It will be appreciated that computer system 10 can be a standard personal computer or workstation, minicomputer, mainframe, or any other suitable computing device, and will typically include many other components (not shown) such as display screen, keyboard, sound card, network adapter card, etc which are not directly relevant to an understanding of the present invention. Note that computer system 10 may also be an embedded system, such as a set top box, handheld device, or any other hardware device including a processor 20 and control software 30, 40. It will also be appreciated that in a typical server environment, multiple JVMs may be running on computer system 10, each running an application representing, for example, a single database transaction.

Figure 2:
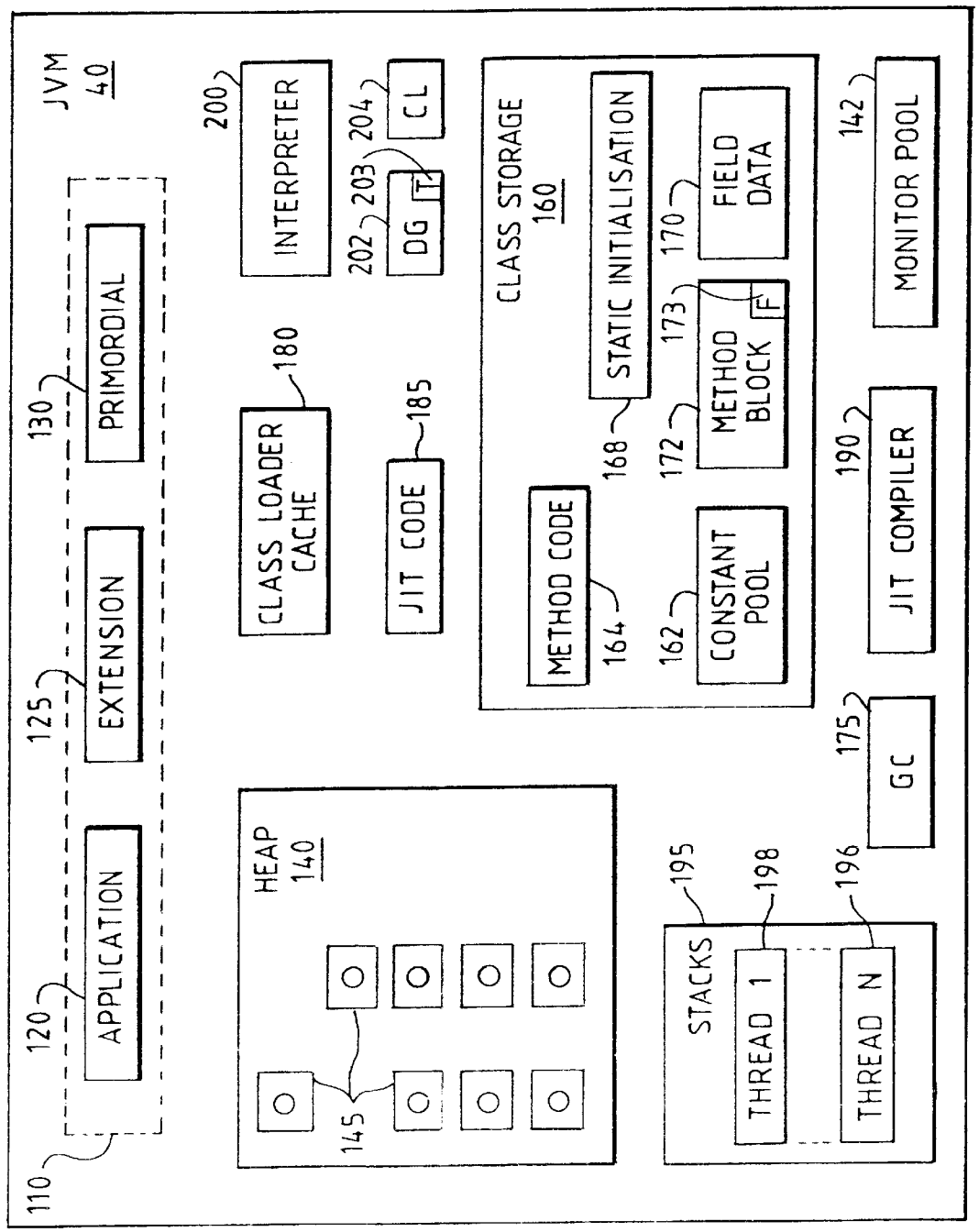
FIG. 2 illustrates some internal components of the JVM.

FIG. 2 shows the structure of the JVM 40 in more detail (omitting some components which are not directly pertinent to an understanding of the present invention). Some of the components shown are written in Java and effectively run within the JVM itself (i.e. are platform independent), whilst others are typically written in C and so run more as an application on operating system 30 (i.e. are platform dependent). The fundamental unit of a Java program is the class, and thus in order to run any application the JVM must first load the classes forming and required by that application. For this purpose the JVM includes a hierarchy of class loaders 110, which conventionally includes three particular class loaders, named Application 120, Extension 125, and Primordial 130. An application can add additional class loaders to the JVM (a class loader is itself effectively a Java program), and these hang off the hierarchy shown in FIG. 2.

The JVM further includes a component CL 204, which also represents a class loader unit, but at a lower level. In other words, this is the component that actually interacts with the operating system to perform the class loading on behalf of the different (Java) class loaders 110.

Note that the JVM specification only requires that classes are loaded before their first active use. Thus the class loader must load the initial class of a program, and all those necessary to run it, but can defer loading any classes called by the initial class until after the initial class has started to run. In practice however, most class loaders attempt to load most of the necessary classes for a program at start-up time.

The JVM also includes a heap 140, which is shared between all threads, and is used for storage of objects 145. Each loaded class represents an object, and therefore can be found on the heap. In Java a class file effectively defines an object, and this is then instantiated one or more times in order to utilise the object. Each such instance is itself an object which can be found in heap 140. Thus the objects 145 shown in the heap in FIG. 2 may represent class files or object instances.

The JVM further includes a class storage area 160, which is used for storing information relating to the class files in the heap 140. This area includes the method code region 164 for storing byte code for implementing class method calls, and a constant pool 162 for storing strings and other constants associated with a class. The class storage area also includes a field data region 170 for sharing static variables (static in this case implies shared between all instances of a class), and an area 168 for storing static initialisation methods and other specialised methods (separate from the main method code 164). The class storage area further includes a method block area 172, which is used to stored information relating to the code, such as invokers, and a pointer to the code, which may for example be in method code area 164, in JIT code area 185 (as described in more detail below), or loaded as native code such as C, for example as a dynamic link library (DLL).

Classes stored as objects 145 in the heap 140 contain a reference to their associated data such as method byte code etc in class storage area 160. They also contain a reference to the class loader which loaded them into the heap, plus other fields such as a flag to indicate whether or not they have been initialised.

The JVM further includes a storage area for just-in time (JIT) code 185, equivalent to method byte code which has already been compiled into machine code to be run directly on the native platform. This code is created by the JVM from Java byte code by a compilation process using JIT compiler 190 when the application program is started up, and is used to improve run-time performance by avoiding the need for this code to be interpreted later.

Other components of the JVM are the interpreter 200, and stack area 195. The interpreter is responsible for reading in Java byte code form from loaded classes, and converting this into machine instructions for the relevant platform. From the perspective of the application, the interpreter looks like a virtual machine, and cooperates with the stack area, which is used for storing the stacks 196, 198 associated with the execution of different threads on the JVM. Note that because the system libraries and indeed parts of the JVM itself are written in Java, and these frequently use multi-threading, the JVM may be supporting multiple threads even if the user application 50 running on top of the JVM contains only a single thread itself.

Also included within JVM are class loader cache 180 and garbage collection (GC) unit 175. The former is effectively a table used to allow a class loader to trace those classes which it initially loaded into the JVM. Note that it is part of the overall security policy of the JVM that classes will typically have different levels of permission within the system based on the identity of the class loader by which they were originally loaded.

Garbage collection unit 175 is used to delete objects from heap 140 when they are no longer required. Thus in the Java programming language, applications do not need to specifically request or release memory, rather this is controlled by the JVM itself. Therefore, when Java application 120 creates an object 145, the JVM secures the requisite memory resource. Then, when the Java application finishes using object 145, the JVM can delete the object to free up this memory resource. This latter process is known as garbage collection, and is generally performed by briefly interrupting all threads 196, 198, and scanning the heap 140 for objects which are no longer referenced, and hence can be deleted. The details of garbage collection vary from one JVM implementation to another, but typically GC is scheduled when the heap is nearly exhausted and so there is a need to free up space for new objects.

FIG. 2 also shows a monitor pool 142, which is used for storing a set of locks (monitors) which are used to control contention to an object by different threads at times when exclusive access to the object is required.

Finally, and of particular relevance for an understanding of the present invention, the JVM includes DG, a diagnostic unit 202, which is responsible for the output of trace information.

Figure 3:
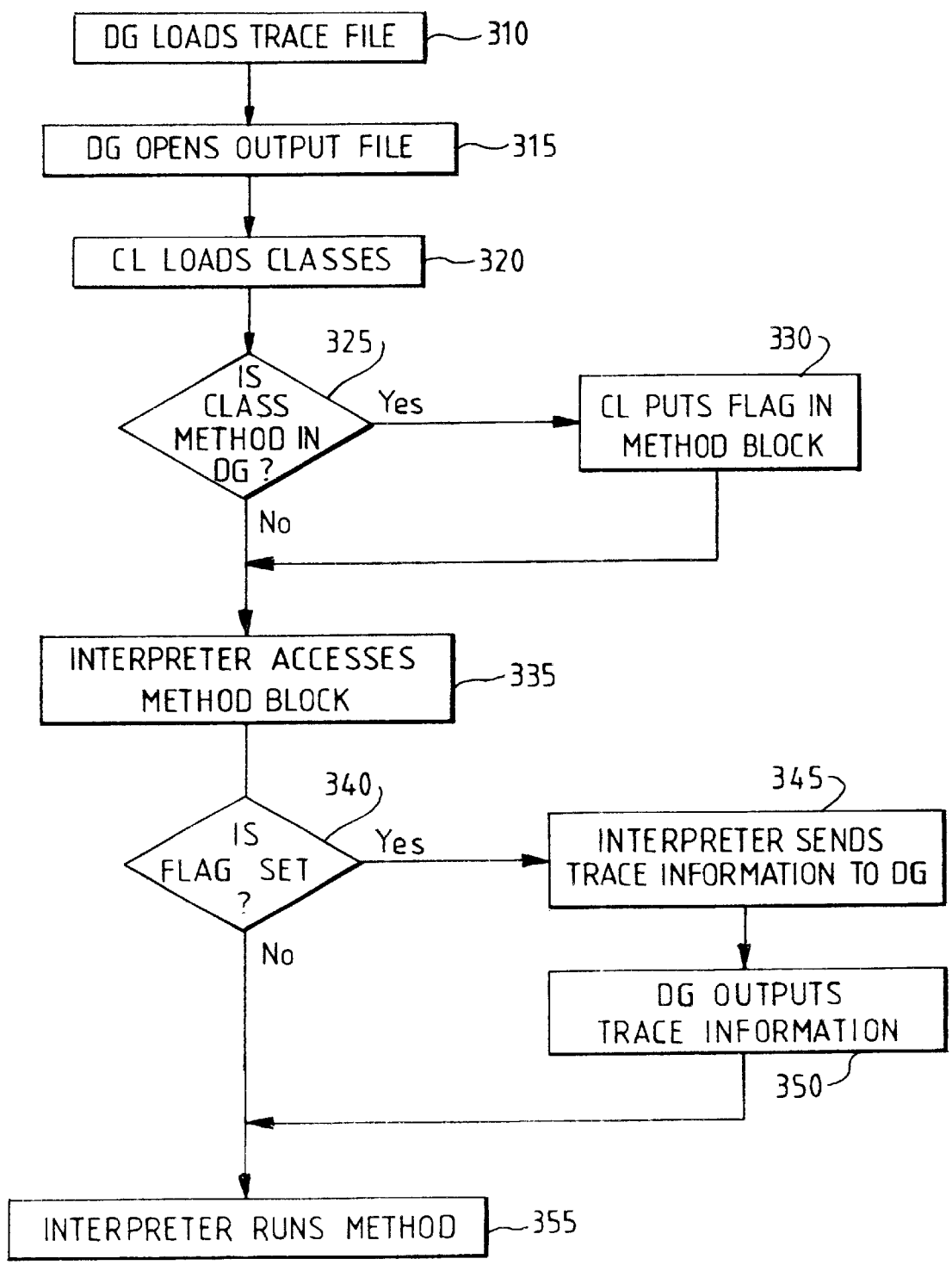
FIG. 3 shows a flowchart depicting operation of the JVM in accordance with a preferred method of the present invention.

The processing in accordance with a preferred embodiment of the present invention is depicted in FIG. 3. The user must first specify the desired trace information for DC. One possibility is to do this as a run-time command option, but this typically becomes rather impractical due to the length of the specification which must be provided. Therefore in the preferred embodiment the specification of the desired trace information is provided in a file which is loaded by DC at the start of the program (step 310). In this case only the identity of the file now needs to be specified to DC; this can be done typically via a run-time start-up option.

The file comprises a table which lists those methods which it is desired to trace (the table as loaded into DC is shown schematically as T 203 in FIG. 2). Typically the methods to be traced will be specified by class and method name. Note that this does not actually uniquely specify a method, since Java supports method overloading, whereby two or more methods in the same class have the same name, but differ in parameter types (this may be used for example to perform the same operation on an integer, a floating point number, and so on). Thus in the preferred embodiment parameter type may also be used in addition to method name and class to specify a method; if this is not done, then a reference to a method having a particular name will be taken to include all methods having that name.

The preferred embodiment also supports specifying just a class name or just a method name (with or without parameter type) for tracing. In the former case all methods in that class will be traced, in the latter case all methods having that name (irrespective of class) will be traced. This latter option is typically used in situations where one class overrides a method in one of its superclasses. This might often be done where the method in the class has essentially the same purpose as the overridden method in the superclass, but with certain modifications. It might well be desirable to trace all methods having a particular purpose (such as performing a particular update to a database).

Optionally the various items of trace information desired for any given method can also be specified, for example parameter or timing information (it is assumed that the name of the method itself will always be output). This is discussed in more detail below. At the same time DC also opens an output file (step 315), into which the desired trace information will be written.

Next in FIG. 3, the class loader unit CL loads the classes for the program, plus the necessary system classes (step 320). For each individual class being loaded, the relevant data entries are completed in heap 140 and in class storage area 160. In accordance with the preferred embodiment of the present invention, as class loading is being performed CL checks the table in DC, to see which of the methods for that class if any are specified for trace information (step 325). For those methods that are indeed specified, CL inserts a corresponding flag 173 (see FIG. 2) into the relevant method block data 172 for that class (step 330). CL may also need to check for any methods specified by name alone (i.e. irrespective of class) if this option is permitted.

If we now move onto running of the program, this involves the interpreter 200 processing the bytes codes of successive methods. When the interpreter encounters a method call in the code, it goes to the corresponding method block 172 (step 335). In accordance with the preferred embodiment of the present invention, the interpreter then checks the flag in this method block (step 340), and if set, it makes a call to DG 202 (step 345). As part of this call, the interpreter tells DG the name of the method being entered, and any other desired information. DG can now output this information to the trace file (step 350), and the interpreter proceeds with running the method as per normal (step 355).

The operations in FIG. 3 allow a user to specifically define those methods for which trace information is desired. The result is that the user obtains targeted information of particular relevance to his or her concerns. Note that no modifications are needed to the application code itself, which may perhaps only be available in byte code form. Furthermore, there is relatively minor impact on system performance, since in general the interpreter needs only to perform one additional flag check (step 340) per method call, apart from the output of the trace information (steps 345 and 350) for the relevant methods. This allows the behaviour of applications to be tested in realistic or potentially even production situations. If performance is particularly important, the JVM may provide two interpreter loops, the first conventional, the second supporting the trace facility illustrated in FIG. 3. A run-time option could then be used to switch between the two. This therefore provides a JVM which supports selective tracing as shown in FIG. 3, yet at the same time can run an application with essentially no performance degradation if tracing is not selected.

The operations shown in the flowchart of FIG. 3 need to be modified somewhat if JIT compiler code is used. Thus as previously mentioned, JIT code is stored separately from Java byte code, and control does not return to the interpreter 200 inbetween successive method calls. One possibility is therefore to provide the tracing ability only when the JIT is turned off, this being a run-time option available to all applications. However, in the preferred embodiment, the JIT compiler 190 itself is modified. In particular, as each method is compiled, the JIT compiler finds out from DG whether that method has been selected by the user for tracing. If so, the JIT inserts some additional code into the compiled method code which effectively calls DG at the start and conclusion of the method. This additional code then provides the desired tracing information to DC for output to the trace file.

In the preferred embodiment, the output of DC trace information (step 350) is actually to internal memory. DC runs a separate thread to transfer this trace information from the internal memory to an output file on disk. The user can select (for example in the trace specification file loaded at start up time) whether this transfer happens essentially continuously, whether the trace information is buffered for periodic output to disk, or whether the trace information is only saved to disk in the event of some application error or failure. In the last situation it will typically be the case given memory limitations that trace information from early in the running of the program are overwritten by subsequent trace information (i.e. the trace information is effectively stored in a circular buffer); this is acceptable since generally it is only the trace information just before the error that is of interest. Clearly the less trace information that is being written out to disk, the lower the impact of the tracing on performance.

It will be appreciated that there are many variations on the preferred embodiment described above. For example, in the preferred embodiment a simple flag is written into the method block, which the interpreter then uses as a prompt to call DC. However in another embodiment, the interpreter might simply always interrogate DC as to whether trace information is required, or indeed at start up the list of methods to be traced might be passed into the interpreter, where it could be directly checked by the interpreter at each method entry. This may be comparable in performance to putting the flag into the method block, particularly if the table is small.

There is also scope for wide variation in the sort of information that is provided about a called method. The following is a non-exhaustive list of the sort of information elements that might be desired: thread id, calling method name, calling object reference, time, parameter values, parameter types, identity of object reference against which the method is called (the method comes from a class file which can be instantiated to multiple objects - this could identify which particular one was involved with this method), state of the object against which the method is called. Furthermore, it is often desirable for analogous information to also be provided on method exit. Typically here the method return value would also be of interest. Clearly the more information that is required, generally the greater the impact on system performance will be (this is particularly so for output on object state, which may be relatively extensive).

The input file to DC could therefore be used to specify which particular trace information is required for any particular method, and whether for method input/exit or both. There any many ways in which this additional capability could be implemented. For example, the description of the desired trace information could be stored in the method block itself, such as by using a multiple bit flag, or the interpreter could call DG for this information responsive to a simple single-bit flag in the method block, or as previously mentioned access the table direct. As regards the provision of information at method exit, the interpreter could either repeat the above operation, such as looking at the method block flag, at method exit, or it could perform this operation only at method entrance, and then store the relevant information internally until method exit.

It will also be appreciated that there is considerable flexibility in the relative timing of the steps shown in FIG. 3. For example, as previously mentioned, some class loaders may load all classes in one initial operation, whilst others may not load some classes until they are specifically required. In the latter case the loading of classes (step 320) will be prolonged and interleaved with the other operations shown in FIG. 3. There are also many other potential variations in the order of the method steps which the skilled person will understand are not significant to the operation of the invention. For example the order of the first two steps of FIG. 3 (DG loading the trace file and opening the output file) may be interchanged, and/or step 355 (the interpreter running a method) may be performed in parallel with step 350 (the DG outputting trace information). Other possible modifications and variations will be apparent to the skilled person.

I claim:

1. A method of operating a virtual machine including an interpreter in an object-oriented system to provide trace information about specific method calls, said method comprising the steps of:

providing a selection of user-defined methods to be traced from an application program, said selection of user-defined methods created independently without changing said application program;

running the application program on the interpreter;

for each method call in the application program, determining by said virtual machine using said selection of user-defined methods whether or not the method is included within said selection; and for those methods which are determined to be included within said selection, outputting trace information about the method call.

2. The method of claim 1, wherein there is a method block associated with each method which is used by the interpreter to invoke the method, and said method further comprises the steps of:

for each method that is included within said selection, setting a flag within a method block associated with the method; and checking the status of the flag when the interpreter invokes a method using a method block, in order to determine whether or not the method is included within said selection.

3. The method of claim 2, wherein said step of providing a selection comprises creating a table of method calls to be traced from a an application program, and wherein said step of setting a flag is performed for those method calls included within the table.

4. The method of claim 2, wherein said flag comprises multiple bits in order to indicate the type of trace information required for any particular method.

5. The method of claim 3, wherein said flag comprises multiple bits in order to indicate the type of trace information required for any particular method.

6. The method of claim 1, further comprising the steps of:
compiling code for at least some method calls prior to running the application program on the interpreter; and
during said compiling step, including code for outputting trace information in those method calls included within said selection.

7. The method of claim 1, wherein said determining step is performed by the interpreter.

8. An object-oriented system including a virtual machine that provides trace information about specific method calls, said system comprising:
a user-defined table specifying methods to be traced from an application program, said selection of user-defined methods created independently without changing said application program;
an interpreter for running the application program;
means for determining by said virtual machine using said selection of user-defined methods for each method call in the application program whether or not the method is included within said table; and
a diagnostics unit for outputting trace information about a method call for those methods which are determined to be included within said table.

9. The system of claim 8, further comprising:
a method block associated with each method which is used by the interpreter to invoke the method;
a flag within a method block which is set for each method that is included within said table; and
means for checking the status of the flag when the interpreter invokes a method using a method block, in order to determine whether or not the diagnostics unit should output trace information about the method call.

10. The system of claim 9, wherein said flag is set for those methods included within the table.

11. The system of claim 10, wherein said flag comprises multiple bits in order to indicate the type of trace information required for any particular method.

12. The system of claim 8, further comprising a just in time compiler, including means for including code for outputting trace information in those method calls included within said table.

13. The system of claim 8, wherein said means for determining is included within the interpreter.

14. A computer program product including computer program instructions in machine readable format, which, when performed on a computer system, provide a virtual machine including an interpreter for implementing the steps of:
providing a selection of user-defined methods to be traced from an application program said selection of user-defined methods created independently without changing said application program;
running the application program on the interpreter;
for each method call in the program, determining by said virtual machine using said user-defined methods whether or not the method is included within said selection; and
for those methods which are determined to be included within said selection, outputting trace information about the method call, to thereby provide trace information about specific method calls.

15. The computer program product of claim 14, wherein there is a method block associated with each method which is used by the interpreter to invoke the method, and said computer program product further includes instructions for implementing the steps of:
for each method that is included within said selection, setting a flag within a method block associated with the method; and
checking the status of the flag when the interpreter invokes a method using a method block, in order to determine whether or not the method is included within said selection.

16. The computer program product of claim 15, wherein providing a selection comprises creating a table of method calls to be traced from the application program, and wherein setting a flag is performed for those method calls included within the table.

17. The computer program product of claim 16, wherein said flag comprises multiple bits in order to indicate the type of trace information required for any particular method.

18. The computer program product of claim 14, further including instructions for implementing the steps of:
compiling code for at least some method calls prior to running the application program on the interpreter; and
during said compiling, including code for outputting trace information in those method calls included within said selection.

19. The computer program product of claim 14, wherein the determination of whether or not the method is included within said selection is made by the interpreter.

* * * * *